Patented Mar. 14, 1933

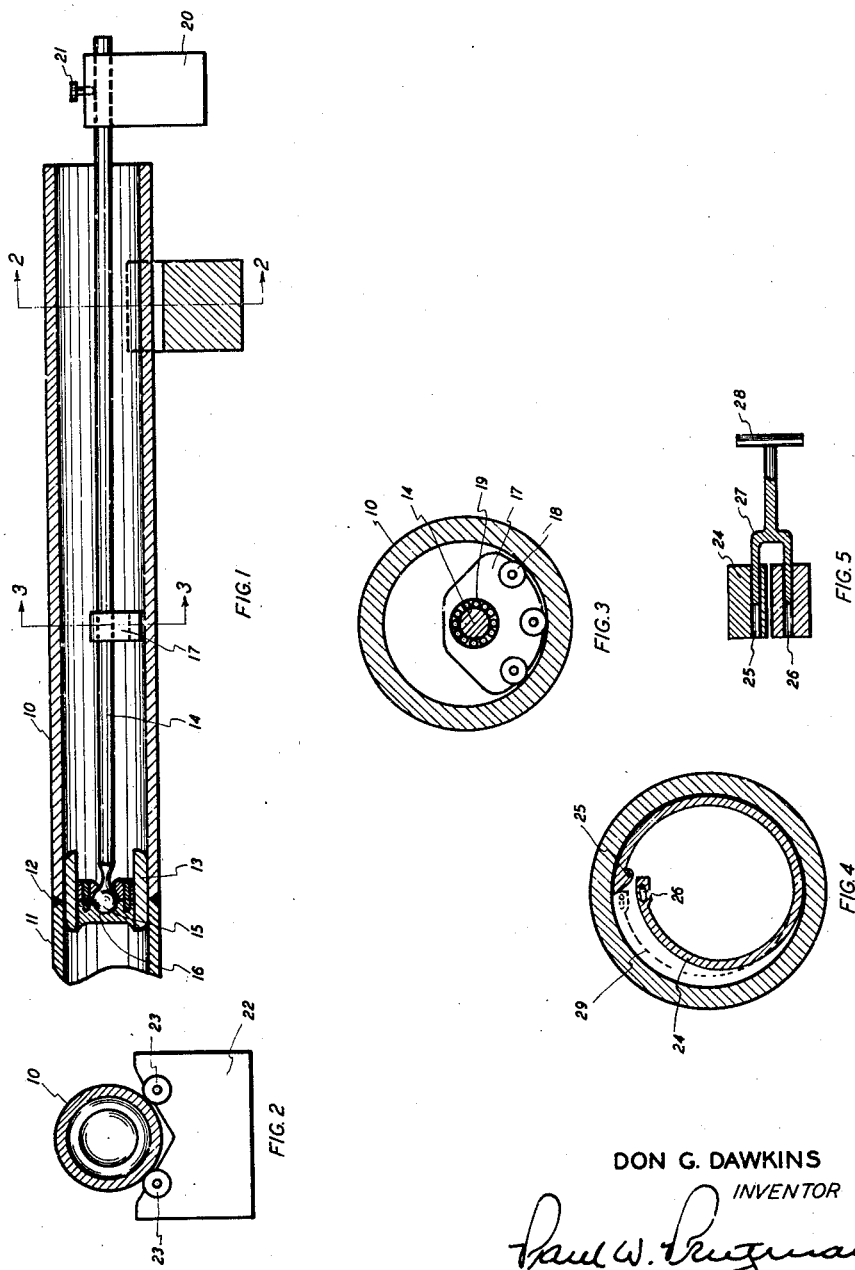

1,901,634

UNITED STATES PATENT OFFICE

DON G. DAWKINS, OF HUNTINGTON PARK, CALIFORNIA

REMOVABLE CHILL RING

Application filed May 17, 1932. Serial No. 611,868.

The object of my invention is to provide a removable chill ring or back-up for use in welding joints of pipes together, as in the construction of pipe lines.

In welding longitudinal seams, as in making pipe or drums from rolled sheets, it is common practice to use back-up strips or "chill" plates. In welding iron and steel, these back-up or chill plates are usually made of copper because of its relatively high thermal conductivity and melting point.

The results of the use of a chill plate are well known. Where such a plate is used, it is possible to obtain proper fusion to the bottom of the beveled edges and flush joints on the inside of the pipe. Where it is not used, the weld will, in almost all cases, show constantly recurring internal projections of metal ("icicles") due to over-fusion alternating with spots where fusion is not carried to the bottom of the groove, the weld thus having less than full strength. The obvious purpose of the chill plate is to enable the operator to fuse a sufficient amount of metal to completely fill the groove without danger of any of this metal flowing through the bottom.

To facilitate the welding of circumferential joints in pipe line construction it is customary to use a thin gauge pressed steel ring which serves the same purpose as the chill plate mentioned above. This steel ring, however, is not removable and is a serious disadvantage inasmuch as it reduces the diameter of the pipe. To obviate this disadvantage several manufacturers bell the ends of their pipe to receive this thin steel ring or liner, thus avoiding reduction of diameter, but only at a serious addition to manufacturing cost.

My invention provides a removable chill ring which can be used in pipe having the same diameter throughout its length and which enables the welder to revolve the pipe during the welding operation so as to work only on the upper portion of the circumferential groove, the chill ring automatically taking a position in the upper portion of the pipe as the latter is revolved.

My invention also provides a contractible chill ring which may be placed in the pipe in contracted form and therein expanded to the full inner diameter of the pipe so as to afford a backing for the entire joint.

The object and advantages of my invention may be seen by reference to the attached drawing, in which:

Fig. 1 represents in longitudinal section a complete assembly with a solid ring in place in the pipe.

Fig. 2 is a cross section on the line 2—2 of Fig. 1;

Fig. 3 is a cross section on the line 3—3 of Fig. 1, on an enlarged scale;

Fig. 4 illustrates in cross section the contractible form of chill ring, and

Fig. 5 illustrates in longitudinal section a means for contracting and expanding this ring.

Referring to the figures, 10 and 11 are joints of pipe having their adjacent edges beveled in order to form a circumferential joint as at 12. 13 is a continuous ring of copper having an outside diameter slightly less than the inside diameter of the pipe to be welded. 14 is a relatively stiff rod or pipe, an end of which is swiveled inside the chill ring as by the ball 15 seated in any convenient spider or frame 16 to which the chill ring 13 is attached.

Referring to Figs. 1 and 3, 17 is a metal block shaped to approximately fit the inner curvature of the pipe and carried on rollers 18. The supporting rod 14 is carried in the upper portion of this block, as by a roller bearing 19.

The end of rod 14 which projects from the pipe is provided with a weight 20 which may be set in position on the rod by means of a set screw 21. The use of this weight is optional as, if the bearing block 17 is set close enough to the chill ring 13, the weight of the outer end of the rod will suffice to hold the upper part of the chill ring in contact with the upper inner surface of the pipe.

In Fig. 2, 22 is the conventional dolly block provided with rollers 23 on which the pipe 10 may be revolved while the joint is being welded.

My device is used in the following manner: The chill ring 13 with its supporting rod 14 is inserted in the pipe and moved inwardly until the chill ring is more or less centered on the seam to be welded; in this operation the outer end of the rod is sufficiently lifted to enable the block 17 to maintain a position more or less adjacent to the chill ring, as illustrated in Fig. 1. The outer end of the rod is then lowered and, if necessary, the weight 20 is attached. The weight of the free end of the rod, together with that of the attached weight 20, if used, then lifts the chill ring into contact with the upper inner surface of the pipe, the block 17 acting as a fulcrum.

Such portion of the joint as is now in contact with the chill ring is welded and the pipe then revolved through a relatively small arc to bring to the upper side an unwelded portion of the joint. The free end of the rod is then lifted, allowing the block 17, the weight of which is unbalanced as shown, to swing to its lowermost position. The free end of the rod being then lowered, the chill ring is again brought into contact with the inner surface of the pipe on the upper side, permitting the uppermost portion of the joint to be welded, and this operation is repeated until the pipe has been revolved through a full circle and the circumferential weld is completed. At this time the weight 20, if used, is removed, the outer end of the rod lifted to free the rollers 18 from contact with the pipe, and the entire apparatus withdrawn from the open end. All these operations may be performed by hand with great rapidity so that no delay to the welding operation is caused.

Referring to Figs. 4 and 5, 24 is a resilient band of metal, as, for instance, hard copper, having a hole 25 in one end and a slot 26 in the other. A yoke 27 having a T handle 28 enters these openings as indicated in Fig. 5. By turning the T handle lefthandedly the ring may be contracted sufficiently to enable it to be moved as desired inside the pipe, while turning the T righthandedly causes the ends of the ring to abut as indicated by dotted line 29, with the ring in contact with the pipe throughout its length.

It will be evident that my invention is susceptible to numerous modifications of structure without departing from its spirit and it is my intention to claim the invention as broadly as the state of the art permits. In the attached claims, where I make use of the term "rod", referring to the part 14 in the attached drawing, it will be understood that this rod may be solid or it may be hollow to form a pipe or tube.

I claim as my invention:

1. A removable chill ring for welding circumferential pipe joints, comprising: a ring of heat-conducting metal having an outside diameter slightly less than the inside diameter of the pipe to be welded; a rod having one end attached to and swiveled within said ring; a fulcrum adapted to fit within said pipe and to support said rod at an intermediate point, and sufficient weight in connection with said rod beyond said fulcrum to hold said ring in contact with the upper inner portion of said pipe.

2. A removable chill ring for welding circumferential pipe joints, comprising: a ring of heat-conducting metal having an outside diameter slightly less than the inside diameter of the pipe to be welded; a rod having one end attached to and swiveled within said ring; a fulcrum rotatable on said rod and having its center of gravity substantially below said rod, said fulcrum adapted to fit within said pipe and to support said rod at an intermediate point, and sufficient weight in connection with said rod beyond said fulcrum to hold said ring in contact with the upper inner portion of said pipe.

In witness that I claim the foregoing I have hereunto subscribed my name this 10 day of May, 1932.

DON G. DAWKINS.